United States Patent [19]

Liu

[11] Patent Number: 5,475,724
[45] Date of Patent: Dec. 12, 1995

[54] SPEEDOMETER/ODOMETER APPARATUS

[76] Inventor: Paul Liu, 10F-3, No. 142, Sec. 3, Min Chuan East Road, Taipei, Taiwan

[21] Appl. No.: 281,994

[22] Filed: Jul. 29, 1994

[51] Int. Cl.$^6$ .................................... G01P 3/50
[52] U.S. Cl. ................. 377/24.1; 324/171; 324/178; 364/561
[58] Field of Search ................... 377/24.1; 324/166, 324/178, 171; 364/561

[56] References Cited

U.S. PATENT DOCUMENTS

| | | | |
|---|---|---|---|
| 4,167,699 | 9/1979 | Baker | 324/171 |
| 5,025,401 | 6/1991 | Kato | 324/171 |
| 5,105,150 | 4/1992 | Liu | 324/166 |
| 5,357,451 | 10/1994 | Beaudry et al. | 364/561 |

Primary Examiner—John S. Heyman
Attorney, Agent, or Firm—Browdy and Neimark

[57] ABSTRACT

A speedometer/odometer apparatus, wherein a sensor inputs an electronic sensing signal to an amplifier and a selecting device to be amplified and output as a stable single stroke signal. The signal is combined with a frequency signal from a crystal oscillator and divided into regular pulses. The frequency of the pulses is divided by a frequency divider circuit and output as two signals with high accuracy for respectively controlling the speed indication of the speedometer and mileage indication of the odometer.

4 Claims, 3 Drawing Sheets $T = (YR1 - R16 - R7) \cdot C7$ $F = 32.768 K$ $F = 241.7$ $F = 0.2361$

SPEEDOMETER/ODOMETER APPARATUS

BACKGROUND OF THE INVENTION

The present invention relates to an improved speedometer/odometer apparatus, and more particularly to a speedometer/odometer apparatus which is able to more accurately display the speed/mileage.

In the applicant's U.S. Pat. No. 5,105,150, a wide-band programmable tachometer and speedometer/odometer apparatus of a vehicle is disclosed, wherein a mechanical motion of an engine is first converted into an electronic signal. Then the electronic signal is amplified and sent to a frequency divider 4 and then through a multiplexer 5. A selecting switch 7 is incorporated with the multiplexer 5 to send out a signal with frequency in an operable range. An F-V converter 6 is used to convert the signal from the multiplexer 5 into DC voltages and output the same. The DC voltage are used to drive a tachometer 9 to display the rpm of the engine. The DC voltages are further sent to a V-F converter 10, a frequency divider 11 and a monostable circuit 12 and output as positive pulses. The positive pulses are sent to a counter to calculate and obtain the mileage.

In the above prior art, the output DC voltages are first used to drive the tachometer and then are converted into the frequency signals to enable the counter to calculate, the mileage. According to such arrangements, several shortcomings exist as follows:

1. The sin and cos coordination coils of the speedometer will generate heat to bias the voltage of the IC and affect the accuracy.
2. The error of the speedometer resulting from the temperature difference or mechanical vibration must be first adjusted by a variable resistor so as to zero the speedometer. Such adjustment will lead to change of the output DC voltage and affect the mileage calculation of the odometer counter. As a result, the obtained mileage will be inaccurate.

SUMMARY OF THE INVENTION

It is a primary object of the present invention to provide an improved speedometer/odometer apparatus which first performs the calculation of mileage and then controls the rotation of the indicator of the speedometer. Therefore, the coils of the speedometer will not affect the calculation of mileage.

It is a further object of the present invention to provide the above speedometer/odometer which is able to accurately display both the speed and mileage.

It is still a further object of the present invention to provide the above speedometer/odometer which uses general ICs such as CO4040, CO4051, C4011, LM555, LM1819, etc. The manufacturing cost of the present speedometer/odometer is relatively low and the assembling operation thereof is easier.

The present invention can be best understood through the following description and accompanying drawings, wherein:

DETAILED DESCRIPTION OF THE PREFERRED EMBODIMENT

Figure 1:
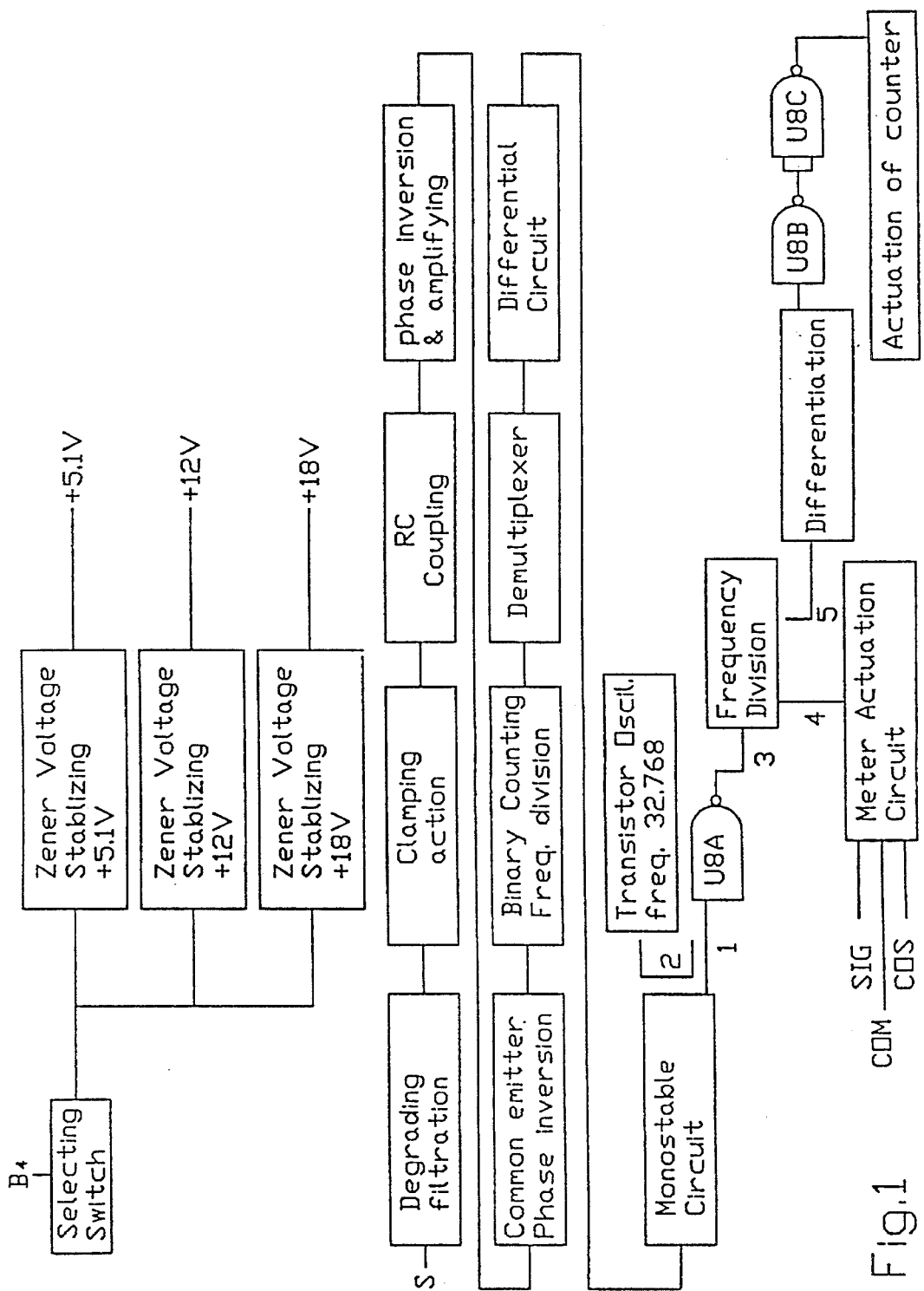
FIG. 1 is a block diagram of an embodiment of the present invention.
Figure 2:
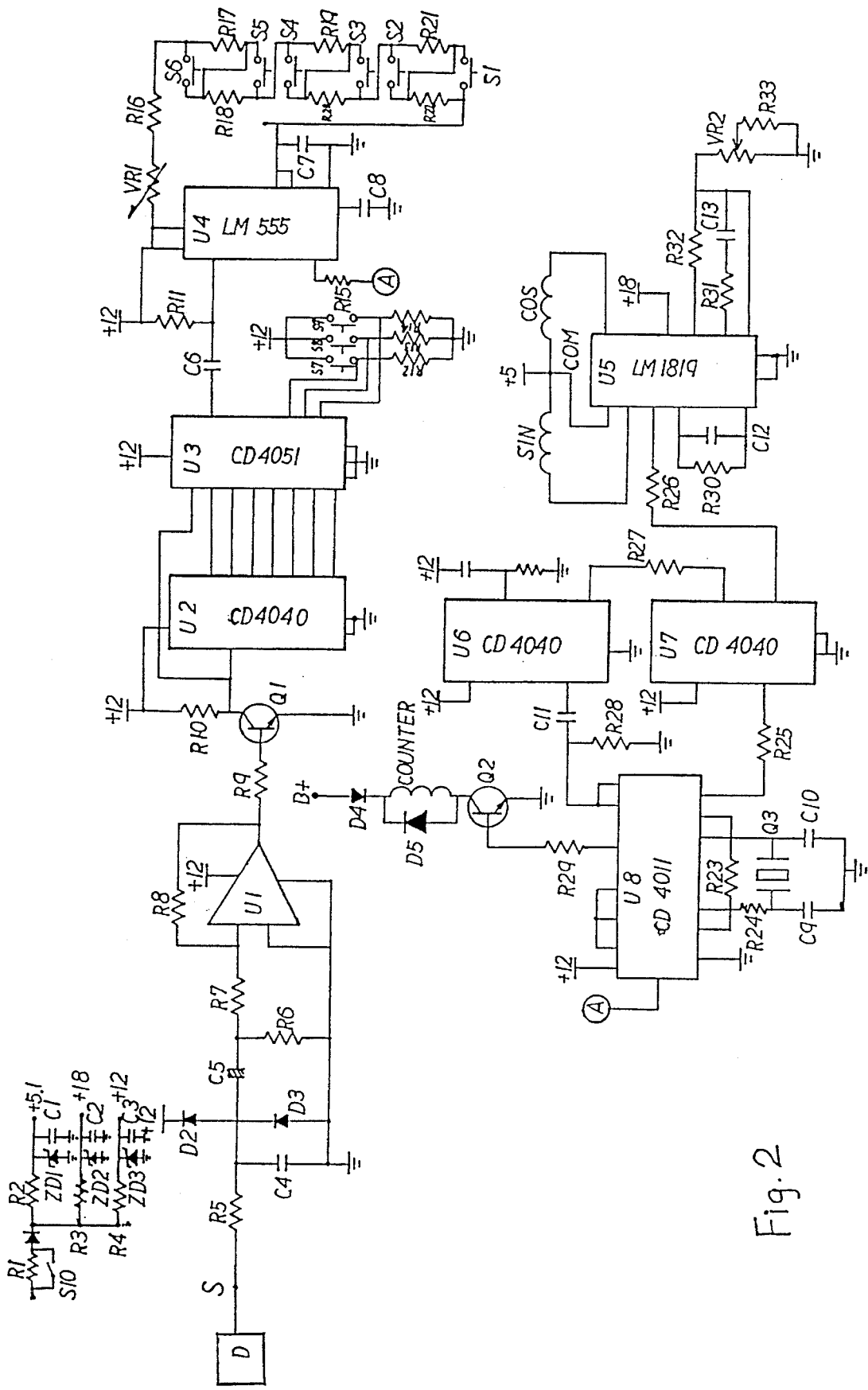
FIG. 2 is a circuit diagram of the embodiment of FIG.

Please refer to FIGS. 1 and 2. The speedometer/odometer of the present invention includes a converting device D for converting an mechanical motion of an engine into an electronic signal as disclosed in U.S. Pat. No. 5,105,150. Besides, the present invention includes a decay filtering circuit composed of R5, C4 for filtering the input signal. D2 and D3 perform clamping action to limit both positive and negative signals and avoid abnormal signal. C5 and R6 form an RC coupling circuit to isolate DC and couple the signals. U1, R8 and R7 form a standard inverted amplifier for amplifying the signal as follows:

$$A_V = -\frac{R8}{R7}$$

R9, R10 and Q1 form a common emitter OE circuit for inverting the phase of the signal and amplifying the same. U2 is a ripple carry binary counter for dividing the input frequency by $2^n$. U3 is a demultiplexer which is selected by switches S7, S8 and S9. C6 and R11 form a differential circuit for differential triggering. U4 is an LM555 IC serving as a single stroke circuit. The negative pulse required by U4 is triggered by the differential circuit.

Figure 3:
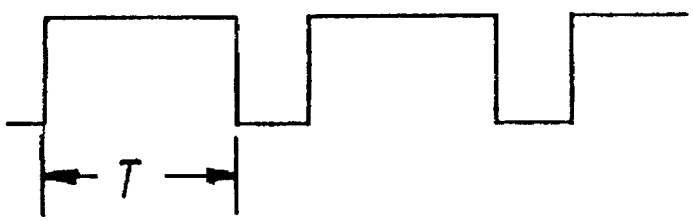
FIG. 3 shows the wave forms of the pulses respectively output from the monostable circuit and crystal oscillator and the wave forms of the combination and frequency division of the pulses.
Figure 3:
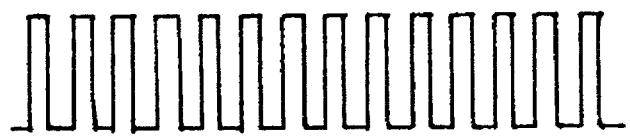
Figure 3:
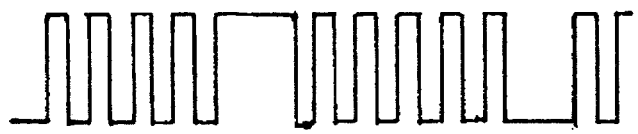
Figure 3:
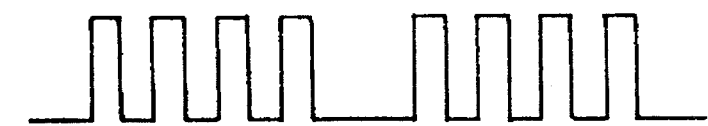
Figure 3:

U4, VR1, R16, R17, R18, R19, R20, R21, R22, S6, S5, S4, S3, S2, S1 and C7 form a monostable circuit the output pulse of which is as shown by section 1 of FIG. 3. The variable resistors VR1, R16, resistor of finger switch and C7 form an RC circuit the charging time of which determines the duty cycle of the output of U4 (LM555). The variable resistor VR1 is used for the adjustment.

R24, R23, C9, C10, Q3 and U8D form a crystal oscillator to generate a pulse with frequency of 32.768K as shown by section 2 of FIG. 3.

The 32.768K frequency and the output signal of LM555 are combined and divided into regular pulses as shown by section 3 of FIG. 3. The number of the pulses is completely controlled by the duty cycle of the output of U4 (LM555). U7 and U6 form a frequency divider circuit. U7, Q5 divide the frequency of the pulses by $2^n$ and U6, Q3 output the frequency to obtain pulses with frequency of 241.8 Hz (as shown by section 4 of FIG. 4) and 0.236 Hz (as shown by section 5 of FIG. 3) which are respectively sent to an air cord and a counter to obtain accurate speed and mileage.

Because the two signals obtained from the frequency divider circuit are respectively input to the air cord and the counter, even in case the indicator of the speedometer is deflected due to external causes and needs to be zeroed, the controlling of the counter still will not be affected. Therefore, the speed and mileage indicated by the speedometer/odometer will be more accurate than a conventional one.

U5 is an air cord meter driver for converting the input frequency into sin and cos pulses to drive the air cord.

C11 and R28 form a differential circuit the differential period of which is determined by the charging time of C11 and R28. The phase is inverted by U8 and reinverted and sent to Q2 to drive the counter. D5 is used to avoid negative pulse.

Please further refer to FIGS. 1 and 2. The voltage selecting switch includes S10, R1 and D1 and the voltage is 24/12 V system. A first stabilizer circuit includes R2, ZD1 and C1 and outputs +5.1 V voltage. A second stabilizer circuit includes R3, ZD2 and C2 and outputs +18 V voltage. A third stabilizer circuit includes R4, ZD3 and C3 and outputs +12 V voltage. These voltages are provided for respective portion of the circuit.

According to a specified specification of the present speedometer/odometer, the frequency can be accurately calculated from the output requirement. For example, if the specification is 85 MPH, 850/3600 time/second can be calculated (one calculation for each 100 meters), that is, 0.2361 time per second or 4.235 seconds for each counting. The frequency divider is selected to be $2^n*0.2361 = 241.77$ Hz. Therefore, as long as a 241.8 Hz signal is generated at full scale (85 MPH), an accurate speed/mileage is output. The present circuit serves to an accurate frequency of 241.8 Hz.

In practical operation, the power cable and signal source (133 Hz, sin wave) are first connected. In the case of 85 MPH, VR1 is adjusted, making U7, Q5 equal to 241.8 Hz. VR2 is adjusted, making the speedometer at full scale as the above calculation. The finger switches S1 to S9 are moved to check whether the scale change of the speedometer is normal. The signal source, 133 Hz sin wave, is altered into a larger frequency. The finger switches S1 to S9 are adjusted to check whether the scale change of the speedometer is normal.

In case the full scale is 140 MPH, the speed/mileage frequency is calculated as:

$$\frac{1400}{3600} * 2^{19} = 203899.7$$

$$x \div 2^9 = 398.2 Hz$$

In case the full scale is 85 MPH, the speed/mileage frequency is calculated as:

$$\frac{850}{3600} * 2^{19} = 123790.2$$

$$x \div 2^9 = 241.8 Hz$$

The above preferred embodiment is only an example of the present invention and the scope of the present invention should not be limited to the example. Any modification or variation derived from the example should fall within the scope of the present invention.

What is claimed is:

1. A speedometer/odometer apparatus for indicating speed and milage of a vehicle, comprising:

a sensor means for converting a mechanical motion of an engine of the vehicle into an electronic signal;

an amplifier means for amplifying said electronic signal;

a binary-counting frequency divider means coupled to said amplifier means for dividing of said amplified electronic signal;

a demultiplexer means coupled to said frequency divider means for demultiplexing said electronic signal;

a differential circuit, coupled to said demultiplexer means and receiving said electronic signal, for triggering;

a monostable circuit triggered by said differential circuit to output stable voltage pulses;

a crystal oscillator for outputting a high frequency signal;

a combiner coupled to said crystal oscillator and said monostable circuit for combining the high frequency signal generated by said crystal oscillator with the stable voltage pulses generated by said monostable circuit into a combined signal and dividing the combined signal into regular pulses;

a frequency divider circuit for dividing a frequency of said regular pulses binarily and outputting a first output signal and a second output signal;

an air cord meter driver circuit for receiving said first signal of said frequency divider circuit to drive an indicator of said speedometer and indicate the speed; and a counter driver circuit for receiving said second output signal of said frequency divider circuit to calculate and indicate the mileage.

2. The speedometer/odometer apparatus as claimed in claim 1, further comprising a decay filtering means connected with a clamping circuit coupled intermediate said sensor means and said amplifier means.

3. The speedometer/odometer as claimed in claim 1, wherein said monostable circuit includes an RC circuit including a variable resistor and a capacitor a duty cycle of which is determined by charging time.

4. The speedometer/odometer as claimed in claim 1, wherein a number of the pulses output by said combiner is controlled by an output duty cycle of said monostable circuit.

* * * * *